US007080655B2

(12) United States Patent
Jacksier et al.

(10) Patent No.: US 7,080,655 B2
(45) Date of Patent: Jul. 25, 2006

(54) REGULATOR FOR LOW CONCENTRATION CORROSIVE AND REACTIVE GASES

(75) Inventors: Tracey Jacksier, Lisle, IL (US); George D Baker, Cambridge, MD (US); Robert Benesch, Clarendon Hills, IL (US); Bruce Talbert, Chicago, IL (US)

(73) Assignees: American Air Liquide, Inc, Fremont, CA (US); Air Liquide America L.P., Houston, TX (US)

( * ) Notice: Subject to any disclaimer, the term of this patent is extended or adjusted under 35 U.S.C. 154(b) by 329 days.

(21) Appl. No.: 10/650,128

(22) Filed: Aug. 28, 2003

(65) Prior Publication Data
US 2004/0173267 A1   Sep. 9, 2004

Related U.S. Application Data

(60) Provisional application No. 60/451,778, filed on Mar. 4, 2003.

(51) Int. Cl.
*G05D 16/04* (2006.01)
*F16K 31/36* (2006.01)

(52) U.S. Cl. ............ 137/14; 137/613; 137/505.25
(58) Field of Classification Search .......... 137/505.25, 137/505.41, 505.42, 613, 14
See application file for complete search history.

(56) References Cited

U.S. PATENT DOCUMENTS

| 3,662,779 | A |   | 5/1972 | Weber et al. ............ 137/489 |
| 3,890,999 | A | * | 6/1975 | Moskow ................ 137/505.25 |
| 4,450,858 | A |   | 5/1984 | Acomb ................. 137/505.37 |
| 5,465,750 | A |   | 11/1995 | Wang ................... 137/484.8 |
| 5,566,713 | A |   | 10/1996 | Lhomer et al. ............ 137/613 |
| 5,665,894 | A |   | 9/1997 | Baker .................... 73/1.05 |
| 5,787,925 | A | * | 8/1998 | Ollivier ................. 137/489.5 |
| 6,003,545 | A | * | 12/1999 | Dukas et al. .......... 137/505.42 |
| 6,153,167 | A | * | 11/2000 | Jacksier et al. ............ 423/417 |

FOREIGN PATENT DOCUMENTS

EP   126202 A   8/2001

OTHER PUBLICATIONS

CRN OH 5216.5C, Calgaz 432 Series Regulator.
Calgaz—Regulators—1000 Series; pp. 1-2.
Report, European Search Report, EP 04075621, Dec. 3, 2004.
Article, J. McAndrew, B. Jurcik D. Znamenski "Using Simulation to Optimize Gas Distribution System and Performance", Journal of the IES, Jul./Aug. 1994.
Article, H-C Wang, G. Doddi, S. Chesters: "Estimating the Lifetime of Electropolished Stainless Steel (EPSS) Tubing in Corrosive Gas Service", Journal of the IES, Jul./Aug. 1994.

* cited by examiner

*Primary Examiner*—Kevin Lee
(74) *Attorney, Agent, or Firm*—Christopher J. Cronin

(57) ABSTRACT

A filter-less regulator is implemented for use in fluid flow systems that process low concentration reactive gases. The regulator includes an inlet, an outlet and a fluid flow path defined between the inlet and outlet by internal surfaces of the housing. The regulator further includes a pressure regulating section to reduce the pressure of a reactive gas flowing through the regulator between the housing inlet and the housing outlet. The internal surfaces of the housing are formed of a suitable material and the combined area of the internal surfaces is sufficiently sized to facilitate use of the regulator in the system without prior passivation for reactive gases at low concentrations (e.g., in the range of about 10 ppm or lower) while minimizing or substantially preventing significant loss of the reactive gas due to reaction and/or adsorption within the regulator.

25 Claims, 9 Drawing Sheets

REGULATOR FOR LOW CONCENTRATION CORROSIVE AND REACTIVE GASES

CROSS REFERENCE TO RELATED APPLICATIONS

This application claims priority from U.S. Provisional Patent Application Ser. No. 60/451,778, entitled "Regulator For Low Concentration Corrosive and Reactive Gas Mixtures", and filed Mar. 4, 2003. The disclosure of this provisional patent application is incorporated herein by reference in its entirety.

BACKGROUND OF THE INVENTION

1. Technical Field

The present invention pertains to regulator devices. In particular, the present invention pertains to regulator devices for delivering low concentrations of corrosive and reactive gas mixtures.

2. Discussion of the Related Art

Regulators are utilized in fluid flow systems to reduce the pressure of a fluid to a lower, safer level that facilitates use of the fluid within the systems. In particular, two-stage regulators are very effective in maintaining the flow of fluid from the outlet of the regulator at a substantially constant pressure despite variations in inlet pressure.

An important function of a regulator is to provide pressure regulation without altering the composition of the fluid by a reaction of one or more fluid components with the internal surface of the regulator. This is a very important issue when dealing with reactive or corrosive gases, such as hydrogen sulfide, sulfur dioxide, carbonyl sulfide, mercaptans, hydrogen chloride, chlorine, ammonia, nitric oxide, nitrous oxide, nitrogen dioxide, carbon monoxide, carbon dioxide, arsine, volatile organic carbons or VOC's, and oxygenates.

For example, hydrogen sulfide ($H_2S$) is known to react with copper to form copper sulfide and hydrogen. Use of a regulator having copper components with a hydrogen sulfide gas would result in a small amount (e.g., a few hundred parts-per-million or ppm) of the hydrogen sulfide gas reacting with, and adsorbing onto, the internal copper surfaces of the regulator. While such small amounts of the gas being consumed may not be noticed, particularly when processing a high concentration hydrogen sulfide gas, prolonged use of the regulator with this gas would result in its degradation and eventual failure. Further, if a regulator made with copper components and/or other materials that are reactive with the gas were to be used for relatively low concentrations of hydrogen sulfide, much or all of the hydrogen sulfide would react with and/or adsorb onto the internal regulator surfaces. Therefore, regulators constructed of copper and/or other reactive materials are not desirable for use with reactive gases at low concentrations.

The reaction of hydrogen sulfide or other reactive gases with the regulator internal surfaces may be limited or substantially avoided by using non-reactive or less reactive materials to form the regulator. In particular, stainless steel (e.g., 316 stainless steel) is commonly used in regulators designed for providing corrosive gas service. Alternatively, brass regulators may be coated with chrome or nickel to improve corrosion resistance. However, it is often difficult to provide a conformal coating to the entire internal brass surfaces of the regulator with chrome or nickel, so a small amount of brass surfaces tend to remain exposed for reaction with gases flowing within the regulator.

Although the use of non-reactive or less reactive materials can limit or prevent the reaction of the gas with the internal surfaces of the regulator, the gas may still adsorb to the internal surfaces of the regulator during operation, resulting in a reduced concentration of reactive gas exiting the regulator at least during an initial use period for the regulator. Many conventional regulators employ a circuitous flow path through the regulator that may include as many as four or more 90° bends between the regulator inlet and outlet. The circuitous flow path results in a large internal surface area and volume of the regulator, which in turn increases the time for which gases may react with wet surfaces and/or adsorb to internal surfaces of the regulator.

Another important consideration that is associated with large internal surface areas is how much of the internal surfaces of the regulator may be wetted. The reactive gases can react with wetted internal surfaces of the regulator, resulting in corrosion of the regulator.

Due to the nature of reactive gases and the probability of reactivity and/or adsorption that can occur between the reactive gases and the internal surfaces of a regulator, conventional regulators typically must be passivated for a sufficient period of time before being placed in service. For example, a period of several hours or even days may be required to passivate a conventional stainless steel regulator in order to ensure that adsorption and/or reactions of reactive gases on the internal surfaces of the regulator are substantially complete so that the regulator can deliver reactive gases at a desired concentration level.

For fluid flow systems that require the measurement of low levels of reactive compounds within the gas flowing in the system, the previously noted issues become a significant concern and reliable equipment and techniques are necessary to monitor, control and regulate the gaseous compounds being delivered in such systems. Instrument manufacturers have been decreasing the lower level of detection of gaseous compounds into the low parts-per-billion (ppb) range. For example, sulfur-containing standards are now available at concentrations of 50–100 ppb. While conventional stainless steel regulators may be employed to process low concentration reactive gases, these regulators must first be passivated before being implemented for use, which can require a considerable amount of time. In addition, these large surface area regulators are more susceptible to having wet areas and are not as easy to thoroughly dry prior to use.

Thus, there exists a need for a regulator adapted to reliably deliver low concentration reactive gas mixtures for processing in a flow system that requires little or no passivation prior to being implemented for use in a fluid flow system.

OBJECTS AND SUMMARY OF THE INVENTION

Accordingly, it is an object of the present invention to provide a regulator to deliver reactive gases in a fluid flow system at suitable pressures.

It is another object of the present invention to provide a regulator that is designed to minimize or substantially prevent the reaction and/or amount of adsorption of reactive gases with the internal surfaces of the regulator.

It is a further object of the present invention to provide a regulator that reliably delivers a reactive gas at low concentrations at or below 10 ppm within a fluid flow system.

It is yet another object of the present invention to provide a regulator that requires minimal or no passivation prior to being put into service in a fluid flow system.

The aforesaid objects are achieved individually and/or in combination, and it is not intended that the present invention be construed as requiring two or more of the objects to be combined unless expressly required by the claims attached hereto.

According to the present invention, a filter-less regulator is implemented for use in fluid flow systems that process low concentration reactive gases. The regulator includes an inlet, an outlet and a fluid flow path defined between the inlet and outlet by internal surfaces of the housing. The regulator further includes a pressure regulating section to reduce the pressure of a reactive gas flowing through the regulator between the housing inlet and the housing outlet. The internal surfaces of the housing are formed of a suitable material and the combined area of the internal surfaces is sufficiently sized to facilitate use of the regulator in the system without prior passivation for reactive gases at low concentrations in the ppb range while minimizing or substantially preventing significant loss of the reactive gas due to reaction and/or adsorption within the regulator.

In particular, the design and sizing of the regulator internal surfaces enables processing of a reactive gas having an inlet concentration no greater than about 10 ppm and flowing at a suitable flow rate (e.g., at least about 50 mL/min) into the housing inlet such that an outlet concentration of the reactive gas does not significantly fluctuate from the inlet concentration when the regulator is implemented for use in the fluid flow system without prior passivation. Preferably, the regulator is suitably designed and dimensioned to be implemented in service without prior passivation and with a low concentration reactive gas (e.g., no greater than 10 ppm) while maintaining an outlet concentration from the regulator that does not decrease to less than about 10% of the inlet concentration during an initial period (e.g., the first hour) of regulator use. In addition, the regulator preferably maintains the outlet concentration of the reactive gas during the initial period (e.g., the first hour) of regulator use to within about 5% of the relative standard deviation.

The material forming a majority of the internal surfaces of the regulator is preferably stainless steel, and the internal surfaces of the regulator preferably define a generally linear fluid flow path and encompass a combined area of no greater than about 97 square centimeters (about 15 square inches). Further, the pressure regulating section of the regulator preferably includes a plurality of pressure reducing stages to reduce the pressure of the reactive gas from an inlet pressure to an outlet pressure that is lower than the inlet pressure.

The combination of no filter, suitable material and low regulator internal surface area decreases the residence time of reactive gases flowing through the regulator, which in turn reduces the amount of reactive gas that can adsorb and/or react and be consumed within the regulator.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
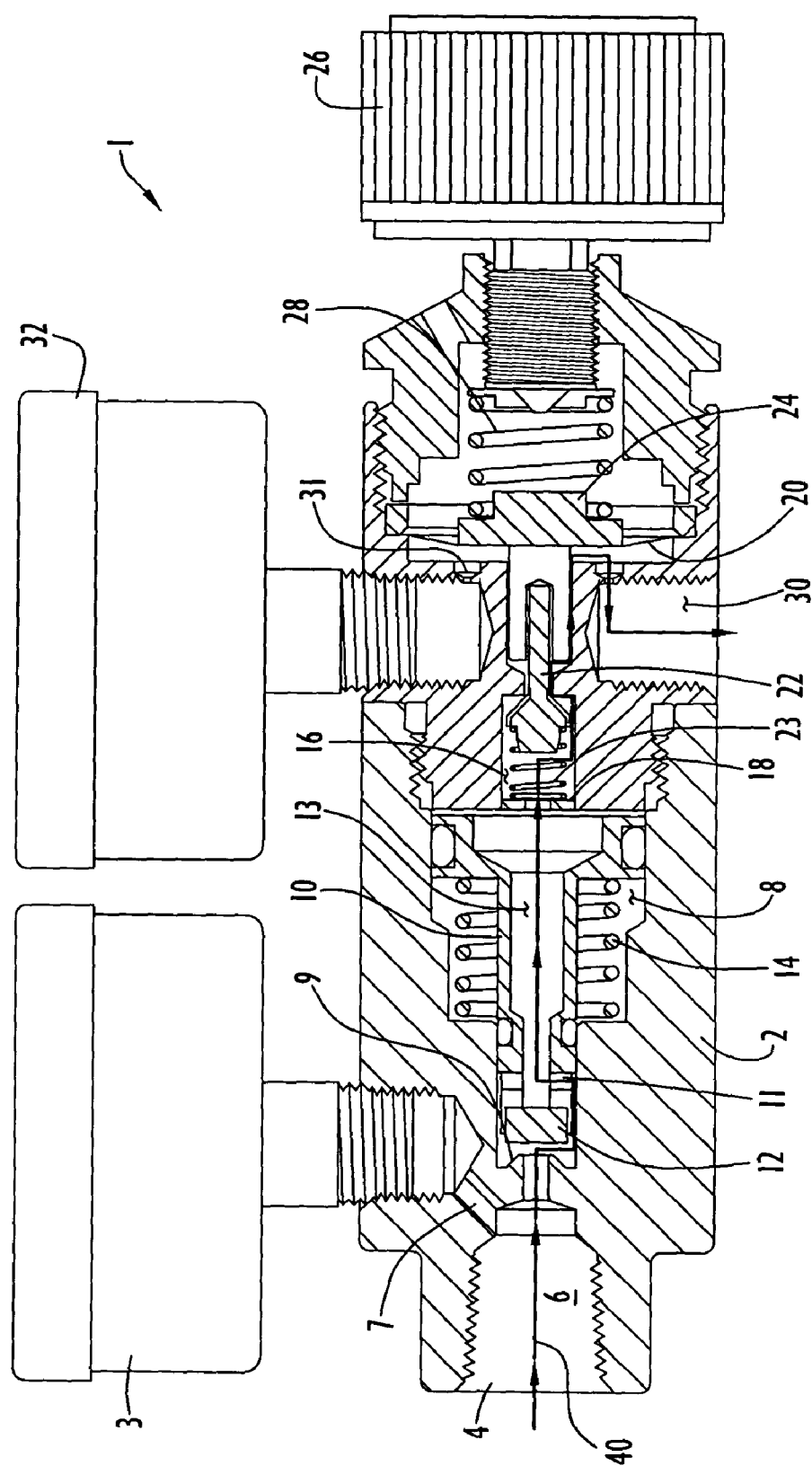
FIG. 1 is a cross-sectional view of a two-stage regulator in accordance with the present invention.

A regulator of the present invention includes a reduced internal surface area that is exposed to gases flowing within the regulator and is effective for use with low concentration reactive gases (e.g., reactive gases flowing through the regulator in the range of no greater than about 10 ppm). As used herein, the terms "corrosive gas" and "reactive gas" are used interchangeably and refer to any gas that, during operation of a pressure regulator, may react with one or more types of materials disposed on or forming the internal surfaces and/or other portions of the regulator.

Exemplary reactive gases that may be utilized with the regulator include, without limitation, sulfur-containing compounds such as hydrogen sulfide, sulfur dioxide, carbonyl sulfide, mercaptans, hydrogen chloride, chlorine, boron trichloride, nitrogen-containing compounds such as ammonia, amines, amides, nitric oxide, nitrous oxide and nitrogen dioxide, carbon monoxide, carbon dioxide, arsine, volatile organic carbons (VOC's), oxygenates, and any combination of these and/or other gases. Examples of VOC's and oxygenates suitable for use with the regulator include, without limitation, carbonyl compounds, 2-chlorotoluene, dichlorobenzenes, volatile methyl siloxanes, hexamethyldisiloxane, octamethyltrisiloxane, decamethyltetrasiloxane, dimethylsilicones, 1,1,1,2 tetrafluoroethane, pentafluoroethane, 1,1,2,2, tetrafluoroethane, 1,1,1 trifluoroethane, 1,1 difluoroethane, trichlorofluoromethane, dichlorodifluoromethane, chlorodifluoromethane, trifluoromethane, 1,2 dichloro 1,1, 2,2 tetrafluoroethane, chloropentaflluoroethane, 1,1,1 trifluoro 2,2 dichloroethane, parachlorobenzotri-fluoride, cyclic, branched or linear completely methylated siloxanes, per fluorocarbon compounds, acetone, xylene, toluene, benzene, ethylbenzene, alcohols (e.g., isopropyl alcohol, butylalcohol, ethylalcohol, and methyl alcohol), ketones (e.g., methyl ethyl ketone, methyl isobutyl ketone), ethylene glycol, ethers (e.g., dimethyl ether, and glycol ethers), aldehydes (e.g., acetaldehyde), acetamide, acetonitrile, acetopohenone, 2-acetylaminofluoroene, acrolein, acrylamide, acrylic acid, acrolein, aacrylamide, acrylic acid, acrylonitrile, allyl chloride, 4-aminobiphenyl, aniline, o-anisidine, benzidine, benzotrichloride, benzyl chloride, biphenyl, bis (2-ethylhexyl)phthalate, bis(chloromethyl)ether, Bromoform, 1,3-Butadiene, Caprolactam, Captan, Carbaryl, Carbon tetrachloride, Catechol, Carbon disulfide, Chloramben, Chlordane, Chloroacetic acid, 2-Chloroacetophenone, Chlorobenzene, Chlorobenzilate, Chloroform, Chloromethyl methyl ether, Chloroprene, Cresols/Cresylic acid (isomers and mixture), o-Cresol, m-Cresol, p-Cresol, Cumene, 2,4-D, salts and esters, DDE, Diazomethane, Dibenzofurans, 1,2-Dibromo-3-chloropropane, Dibutylphthalate, 1,4-Dichlorobenzene(p), 3,3-Dichlorobenzidene, Dichloroethyl ether (Bis(2-chloroethyl)ether), 1,3-Dichloropropene, Dichlorvos, Diethanolamine, N,N-Diethyl aniline (N,N-Dimethylaniline), N,N-Diethyl aniline (N,N-Dimethylaniline), Diethyl sulfate, Dimethyl aminoazobenzene, 3,3'-Dimethyl benzidine, Dimethyl carbamoyl chloride, Dimethyl formamide, 1,1-Dimethyl hydrazine, Dimethyl phthalate, Dimethyl sulfate, 4,6-Dinitro-o-cresol, and salts, 2,4-Dinitrophenol, 2,4-Dinitrotoluene, 1,4-Dioxane (1,4-Diethyleneoxide), 1,2-Diphenylhydrazine, Epichlorohydrin (1-Chloro-2,3-epoxypropane), 1,2-Epoxybutane, Ethyl acrylate, Ethyl benzene, Ethyl carbamate (Urethane), Ethyl chloride (Chloroethane), Ethylene dibromide (Dibromoethane), Ethylene dichloride (1,2-Dichloroethane), Ethylene imine (Aziridine), Ethylene oxide, Ethylene thiourea, Ethylidene dichloride (1,1-Dichloroethane), Formaldehyde, Heptachlor, Hexachlorobenzene, Hexachlorobutadiene, Hexachlorocyclopentadiene, Hexachloroethane, Hexamethylene-1,6-diisocyanate, Hexamethylphosphoramide, Hexane, Hydrazine, Hydrochloric acid, Hydroquinone, Isophorone, Lindane (all isomers), Maleic anhydride, Methanol, Methoxychlor, Methyl bromide (Bromomethane), Methyl chloride (Chloromethane), Methyl chloroform (1,1,1-Trichloroethane), Methyl ethyl ketone (2-Butanone), Methyl hydrazine, Methyl iodide (Iodomethane), Methyl isobutyl ketone (Hexone), Methyl isocyanate, Methyl methacrylate, Methyl tert butyl ether, 4,4-Methylene bis(2-chloroaniline), Methylene chloride (Dichloromethane), Methylene diphenyl diisocyanate (MDI), 4,4-Methylenedianiline, Naphthalene, Nitrobenzene, 4-Nitrobiphenyl, 4-Nitrophenol, 2-Nitropropane, N-Nitroso-N-methylurea, N-Nitrosodimethylamine, N-Nitrosomorpholine, Parathion, Pentachloronitrobenzene (Quintobenzene), Pentachlorophenol, Phenol, p-Phenylenediamine, Phosgene, Phosphine, Polychlorinated biphenyls (Aroclors), 1,3-Propane sultone, beta-Propiolactone, Propionaldehyde, Propoxur (Baygon), Propylene dichloride (1,2-Dichloropropane), Propylene oxide, 1,2-Propylenimine (2-Methyl aziridine), Quinoline, Quinone, Styrene, Styrene oxide, 2,3,7,8-Tetrachlorodibenzo-p-dioxin, 1,1,2,2-Tetrachloroethane, Tetrachloroethylene (Perchloroethylene), Titanium tetrachloride, Toluene, 2,4-Toluene diamine, 2,4-Toluene diisocyanate, o-Toluidine, Toxaphene (chlorinated camphene), 1,2,4-Trichlorobenzene, 1,1,2-Trichloroethane, Trichloroethylene, 2,4,5-Trichlorophenol, 2,4,6-Trichlorophenol, Triethylamine, Trifluralin, 2,2,4-Trimethylpentane, Vinyl acetate, Vinyl bromide, Vinyl chloride, Vinylidene chloride (1,1-Dichloroethylene), Xylenes (isomers and mixture), o-Xylenes, m-Xylenes, p-Xylenes, Antimony Compounds, arsine, Coke Oven Emissions, Cyanide Compounds, and Polycylic Organic Matter.

As previously noted, many conventional regulators, particularly two-stage regulators, are designed with circuitous fluid flow paths. Many of these conventional regulators further include large internal surface areas (e.g., much greater than 97 square centimeters or 15 square inches) that are exposed to the gases. In addition, many such regulators require the use of in-line filters to remove particulate material that may be entrained in the flowing gases and can foul up, plug and even damage the regulators. For example, many conventional, two-stage stainless steel regulators employ an orifice consisting of a needle and a Teflon seat in the first pressure reduction stage of the regulator. If particulate material entrained in the gas was permitted to enter this area, the orifice could become damaged so as to not operate properly. The use of an in-line filter with the regulator increases the internal surface area that is exposed to gases being processed by the regulator, which in turn increases the residence time of the gases passing through the regulator as well as the probability of surface reactions and/or adsorption of the gases with the internal surfaces of the regulator.

In addition, there is a higher probability of a regulator with a high internal surface to also have wetted internal surfaces that are exposed to and provide reactive sites for the reactive gas flowing through the regulator. It has been demonstrated that the time to dry a piece of tubing that has been exposed to moisture is a function of tube length. J. McAndrew, B. Jurcik D. Znamenski "*Using Simulation to Optimize Gas Distribution System and Performance*", Journal of the IES, July/August 1994. In other words, as the internal tubing surface area increases, so too does the time period required to sufficiently dry the tubing. Residual moisture present in a regulator can increase the probability of surface reactions with the reactive gas and corrosion of the surfaces. H-C Wang, G. Doddi, S. Chesters: "*Estimating the Lifetime of Electropolished Stainless Steel (EPSS) Tubing in Corrosive Gas Service*", Journal of the IES, July/August 1994.

During operation of a typical fluid flow system, a regulator is attached to a vessel to provide a flow of gas from the vessel at a relatively constant pressure to other portions of the system. The system must be periodically opened to change out vessels (i.e., remove a spent and empty vessel and replace with a new and full vessel). Opening of the system in this manner presents the possibility for moisture to enter the regulator and the system during the change out procedure.

The conventional regulators with high internal surface areas and high volumes can be problematic when used in systems that require a delivery of a low concentration reactive gas. If a high volume regulator is used in such a system, it must first be passivated for a sufficient period of time in order to ensure that the regulator will not consume (i.e., by adsorption and/or reaction) a substantial amount of the low concentration reactive gas flowing through it. As used herein, the terms "passivate" and "passivation" refer to an initial preparation technique of flowing one or more reactive gases of interest through a regulator for a select period of time prior to utilizing the regulator in-line with a fluid flow system under normal operating conditions in which reactive gas(es) are delivered at desired concentrations. The initial passivation step allows for any adsorption and/or reactions to take place at the internal surfaces of the regulator prior to being implemented for service so as to ensure that, during normal system operation, reactive gases are processed by the regulator without significant losses in concentration. Many conventional regulators require a passivation period of several hours or even days prior to being implemented for normal operating service. This can present problems in certain situations in which it is desirable to implement a new regulator rather quickly (e.g., to replace a faulty regulator).

The regulator of the present invention overcomes the problems associated with adsorption and/or reaction of reactive gases during pressure regulation by having a low "dead volume" within the regulator, which in turn shortens the residence time of the gas within the regulator and minimizes adsorption and reactions of the gas with the internal surfaces of the regulator. The "dead volume" within the regulator corresponds with the total or combined area of internal surfaces of the regulator (i.e., the total area of internal surfaces that are exposed within the fluid flow path and are available for interaction with gases passing through the regulator). In particular, the regulator of the present invention includes a combined internal surface area that is no greater than about 97 square centimeters (about 15 square inches), preferably no greater than about 77 square centimeters (about 12 square inches), more preferably no greater than about 52 square centimeters (about 8 square inches), and most preferably no greater than about 47 square centimeters (about 7.25 square inches).

The low internal surface area of the regulator is achieved by utilizing a regulator design that includes a substantially straight or linear fluid flow path having minimal bends or turns. This is different from many conventional high volume regulators that have a circuitous flow path.

In addition, the regulator of the present invention does not include an in-line filter, thus further reducing the internal surface area exposed to the gas and the residence time for the gas within the regulator. Conventional regulators are provided with in-line filters to remove particulate materials from the gases flowing through the regulators that might otherwise foul up and damage the internal components of the regulators. However, the inventors have discovered that, when processing reactive gases at low concentrations below about 10 ppm, the use of an in-line filter is actually detrimental to the processing of the gas and can result in more of the reactive gas being consumed within the regulator by reaction and/or adsorption. Further, the need for an in-line filter diminishes at low gas concentrations, because the low concentration gas has already been purified to a certain extent and is less likely to contain any particulate material that may present a problem within the regulator.

The regulator of the present invention is capable of delivering a low level concentration (e.g., about 10 ppm or lower) of corrosive or reactive gas with a high level of accuracy and with minimal or no passivation required prior to being placed in service within a fluid flow system. In particular, the non-passivated regulator is capable of processing a reactive gas at very low concentrations (e.g., 50 ppb or lower) and deliver the reactive gas at a concentration that does not significantly deviate or fluctuate from the original gas concentration entering the regulator. For example, a regulator of the present invention can be placed into service without prior passivation and process a low concentration reactive gas (e.g., no greater than 10 ppm) while maintaining an outlet concentration from the regulator that does not decrease to less than about 10% of the inlet concentration during an initial period (e.g., the first hour) of regulator service. Preferably, the outlet concentration does not decrease to less than about 25% of the inlet concentration during the initial period of regulator service. More preferably, the outlet concentration does not decrease to less than about 50% of the inlet concentration during the initial period of regulator service. Most preferably, the outlet concentration does not decrease to less than about 75% of the inlet concentration during the initial period of regulator service.

Further, depending upon the flow rate of the reactive gas, the regulator is capable of delivering the reactive gas without prior passivation and within an initial period (e.g., about one hour) of being placed in service at an output concentration that does not significantly fluctuate and that is within about 5% of the relative standard deviation, more preferably within about 3% of the relative standard deviation, and most preferably within about 2% or even about 1% of the relative standard deviation, where the relative standard deviation is determined from measurements of the output reactive gas. One skilled in the art will recognize that instabilities in conventional detectors utilized to measure gas output concentrations will present some level of fluctuation and error in the output gas concentration measurements. The previously noted standard deviation percentage values would be expected to decrease as the sensitivity and accuracy of concentration measurement detectors increases.

Unless indicated otherwise, the components of the regulator are constructed of suitable materials that minimize or substantially prevent reactions between the reactive gas and the internal surfaces of the regulator. Preferably, the majority of internal regulator components are constructed of stainless steel (e.g., 304 stainless steel, 316 stainless steel and/or 3136 stainless steel). However, some or all of the regulator components may also be constructed of other materials (e.g., aluminum). The combination of the low internal surface area and selection of suitable materials of construction allows the regulator to process low concentrations of reactive gases without any significant reduction in gas concentration.

A dual or two-stage regulator for processing reactive gases in accordance with the present invention is depicted in FIG. 1. The two-stage regulator is desirable in that it delivers the gas at a reduced regulator outlet pressure that is relatively constant and does not significantly fluctuate during system operation despite changes in regulator inlet pressure. However, it is noted that the regulator of the present invention may employ any suitable number (e.g., one) of stages to achieve a desired level of pressure reduction for the gas.

The regulator of FIG. 1 includes a piston in the first pressure reduction stage and a diaphragm in the second pressure reduction stage to reduce the inlet pressure of the gas to a lower outlet pressure. The operation of a two-stage regulator utilizing a piston and a diaphragm in the first and second stages is similar in design and operability to the Calgaz 1000 Series regulators (Air Liquide, L.P., Cambridge, Md.). The regulator is further capable of receiving reactive gases from a supply source (e.g., a cylinder) at pressures as high as about 3,000 psig for delivery at pressures as low as 15 psig or less.

Regulator 1 includes a hollow elongated body 2 composed of three sections that are secured to each other by threaded engagement. A bore extends axially through and between the longitudinal ends of body 2 to define high pressure, intermediate pressure and low pressure chambers within the regulator as described below. An inlet 4 is disposed at a first longitudinal end of body 2 and is in fluid communication with a high pressure chamber 6 extending to the first stage of the regulator. The regulator inlet includes internal threads that engage with a threaded supply conduit (e.g., a 0.635 cm or 0.25 inch diameter nipple) to facilitate supply of reactive gas from a vessel to the regulator. The high pressure chamber 6 is in fluid communication with an intermediate pressure chamber 8 that includes the piston components of the first stage. A small channel 7 extends transversely from high pressure chamber 6 and is in fluid communication with an inlet gauge 3. Inlet gauge 3 is secured within a bore of body 2 and extends transversely from the body. The inlet gauge measures and provides an indication to the user of the inlet pressure of the reactive gases at the inlet of the regulator.

An elongated and partially hollow piston 10 extends and is axially movable within intermediate pressure chamber 8. The piston includes a valve seat 12 disposed at a first longitudinal end of the piston and aligned to releasably engage with a tapered conical inlet section 9 of intermediate pressure chamber 8. Inlet section 9 is located at the interface and facilitates fluid communication between the high and low pressure chambers. The piston seat is made of a suitable material (e.g., tetrafluoroethylene) to provide an effective fluid-tight seal between the high and intermediate pressure chambers when the piston seat is engaged with inlet section 9. A bore 11 extends transversely into the piston at a location proximate the first longitudinal end of the piston and is in fluid communication with an axially extending passage 13 disposed within the piston. Passage 13 extends from a location proximate the piston seat to a second longitudinal end of the piston.

A resilient biasing member 14 (e.g., a coil spring) is disposed within a widened section of chamber 8 and extends between and engages annular shoulder portions of chamber 8 and a transversely extending flange section defined at the second longitudinal end of piston 10. Biasing member 14 biases the piston in a direction away from inlet section 9 so that, at a resting position (e.g., no gas is flowing through the regulator), piston valve seat 12 does not engage with inlet section 9. The piston moves axially back and forth within the intermediate pressure chamber based upon the forces acting on the piston by the reactive gas flowing into the intermediate pressure chamber and the opposing forces applied by biasing member 14. This back and forth motion of the piston controls the flow of reactive gas into and through the intermediate chamber, resulting in a reduction of pressure of the reactive gas as the gas flows from the high pressure chamber to the intermediate pressure chamber.

A low pressure chamber 16 extends from intermediate pressure chamber 8 within body 2 to a bore disposed at the second longitudinal end of body 2. The low pressure chamber includes a widened section disposed adjacent the second longitudinal end of the regulator body and a narrow section extending from the widened section to an annular shoulder 18 extending the width of the narrow section and located at the interface between the intermediate and low pressure chambers. Shoulder 18 includes a central opening to permit fluid communication between the intermediate and low pressure chambers.

The low pressure chamber includes the diaphragm components of the second stage. In particular, a diaphragm 20 is disposed within the widened section of chamber 16 and extends across an opening at the interface between the widened and narrow sections of chamber 16. The diaphragm consists of a thin sheet of material (e.g., stainless steel) that is axially flexible within the widened section to releasably engage and seal the opening at between the widened and narrow sections. A poppet member 22 extends and is axially movable within the narrow section of chamber 16 to engage a first surface of diaphragm 20. A resilient biasing member 23 (e.g., a coil spring) is disposed between and engages annular shoulder 18 and a conical end of poppet member 22 to bias the poppet member in a direction toward the widened section so as to engage diaphragm 20.

A valve seat 24 is disposed in the widened section of chamber 16 and engages an opposing second surface of the diaphragm. A pressure control knob 26 is secured in a threaded engagement with the bore disposed at the second longitudinal end of body 2 to permit axial movement of knob 26 with respect to body 2. Valve seat 24 is biased against diaphragm 20, and in a direction that opposes the axial bias of poppet member 22, via a resilient biasing member 28 (e.g., a coil spring) that extends between and engages knob 26 and valve seat 24. Thus, the diaphragm is biased in opposing directions toward and away from a sealing engagement with the opening at the interface between the narrow and widened sections of the low pressure chamber.

An outlet 30 is disposed along a peripheral side surface of regulator body 20 and is in fluid communication with the widened section of low pressure chamber 16. The regulator outlet includes internal threads that engage with a threaded supply conduit (e.g., a 0.318 cm or 0.125 inch diameter nipple) to facilitate supply of reactive gas from the regulator for processing by the system. In addition, a small channel 31 extends from the widened section of low pressure chamber 16 and is in fluid communication with an outlet gauge 32. Outlet gauge 32 is secured within a bore of body 2 and extends transversely from the body at a spaced location from the inlet gauge. The outlet gauge measures and provides an indication to the user of the outlet pressure of the reactive gases exiting the regulator.

In operation, regulator 1 is secured, via inlet 4, to a conduit in fluid communication with a vessel containing a reactive gas. The reactive gas follows a generally linear flow path through regulator 1 as indicated by arrows 40 depicted in FIG. 1. Specifically, the reactive gas flows into and through high pressure chamber 6, into intermediate pressure chamber 8 and around valve seat 12, and through bore 11 and into channel 13 of piston 10. During flow of gas from the vessel through the regulator, the piston moves axially back and forth within intermediate pressure chamber 8 between a position in which valve seat 12 engages and seals the inlet section to the intermediate pressure chamber to positions in which the valve seat is distanced from the inlet section to permit gas to flow from the high pressure chamber into the intermediate pressure chamber. The gas is reduced in pressure as it flows between the high and intermediate pressure chambers as a result of the operation of the moving piston controlling the flow of gas through the inlet section and into the intermediate pressure chamber.

The reactive gas continues to flow in a generally linear path through channel 13 of piston 10, through the opening internal shoulder 18 and into low pressure chamber 16. The gas flows around the conical end of poppet member 22 and through gaps formed between portions of the poppet member and the internal surfaces of the narrow section of intermediate pressure chamber 16. In particular, the poppet member preferably has a multi-faceted cross-sectional geometric configuration (e.g., hexagonal) at selected locations to provide fluid flow path channels between the poppet member and the narrow section of the intermediate pressure chamber.

Pressure control knob 26 can be manipulated (e.g., manually or automatically) to selectively control the outlet pressure of gases emerging from the regulator through outlet 30. Specifically, the control knob may be rotated within the regulator bore to move the control knob axially with respect to the regulator body, which modifies the biasing force applied by biasing member 28 to valve seat 24 and diaphragm 20. This in turn modifies the amount of opposing force necessary to move the diaphragm away from an engaging position with the opening at the interface between the narrow and widened sections of the low pressure chamber. Control knob 26 can be manipulated to achieve a desired outlet pressure for the reactive gases flowing through the regulator, as measured by pressure gauge 32.

As noted above, conventional regulators normally require the use of an in-line filter, with the filter typically being disposed at an inlet section of the regulator, to remove unwanted particulate material from the flowing gas. However, regulator 1 does not require the use of a filter. In addition, the low "dead volume", substantially linear fluid flow path and low surface area design yields a regulator that is small and compact (e.g., no greater than about 12.7 cm or 5 inches in length).

A series of tests were conducted to compare a regulator constructed in accordance with the present invention with other commercially available regulators to determine the performance of the regulators for the processing of a low concentration reactive gas. Hydrogen sulfide was utilized as the reactive gas at concentrations less than 200 ppb in the comparison tests.

A Sievers model 355 sulfur chemiluminescence detector (Sievers Instruments, Boulder, Colo.), interfaced with a Varian Model 3800 gas chromatograph including a 30 m×0.32 mm ID Varian plot fused silica column (Varian, Inc., Walnut Creek, Calif.), was used to measure the concentrations of hydrogen sulfide emerging from the regulators. A Silcosteel™ coated gas sampling valve (Restek Corp, Bellefonte, Pa.) was used to introduce the samples into the gas chromatograph. Silcosteel™ coated tubing was used for all lines that contacted the sample to be analyzed by the detector, including a 1 mL sample loop. Model 1479A flow controllers manufactured by MKS Instruments (Andover, Mass.) and Model GFM171S mass flow meters manufactured by Aalborg Instruments and Controls (Orangeburg, N.Y.) were further utilized to control the flow of gas through the regulators. In addition, all calibration standards and gases used in the comparison tests were obtained from Air Liquide America L.P. (Santa Fe Springs, Calif.).

Comparison tests were conducted using four types of regulators. Two of the four regulator types were two-stage regulators constructed in accordance with the present invention and having a design substantially similar to the regulator described above and illustrated in FIG. 1. The first regulator type (regulator A) was constructed of stainless steel, having a 316 stainless steel body and a 304 stainless steel diaphragm, whereas the second regulator type(regulator B) was constructed with an aluminum body and a stainless steel 304 diaphragm. Both of regulators A and B were devoid of a filter (i.e., filter-less) and included internal surface areas in the range of about 52 square centimeters (8 square inches). The third regulator type (regulator C) was a conventional CONCOA® Model 432 stainless steel two-stage regulator including a filter in both stages and commercially available from Controls Corporation of America (Virginia Beach, Va.). Regulator C included a 316 stainless steel body, a 316 stainless steel diaphragm and 316 stainless steel filters. The fourth regulator type (regulator D) was a Model 1002 Calgaz two-stage regulator commercially available from Air Liquide America L.P. (Cambridge, Md.). Regulator D included a nickel-plated brass body with a 304 stainless steel diaphragm and a brass filter. Regulators A and B were new and had no prior service history.

The same flow system set-up was utilized when testing each regulator type for a particular test. In particular, the inlet of each regulator was connected to a cylinder containing a low concentration of hydrogen sulfide with a balance of nitrogen, and the regulator outlet was connected to the flow controller, with the flow controller delivering gas samples to the chromatograph at a constant flow rate. The flow controller had been previously used with hydrogen sulfide for a sufficient period of time and was therefore expected to exhibit little or no interaction with the gas during testing. However, when low flow rates were utilized in the tests, the flow controller was positioned at a location downstream from the gas chromatograph to accurately control the flow rates at the lower values as well as to avoid any potential reactions or adsorption of the gas from occurring in the flow controller prior to the measurement of hydrogen sulfide concentration. The tubing volume for the system set-up was kept to a minimum to minimize or substantially prevent interactions of the tubing with the gas. Accordingly, any reduction in concentration of hydrogen sulfide between the cylinder and the gas chromatograph in the comparison tests was considered to be attributable primarily to interactions of the gas within the regulator.

A reference signal for the concentration of the hydrogen sulfide was obtained by providing a system set-up that included a Hastelloy restricting flow orifice in place of a regulator. The Hastelloy restricting flow orifice was approximately 30 microns in diameter and was coated with Sulfinert™ material to prevent or substantially limit any interactions with the hydrogen sulfide gas during use.

Figure 2:
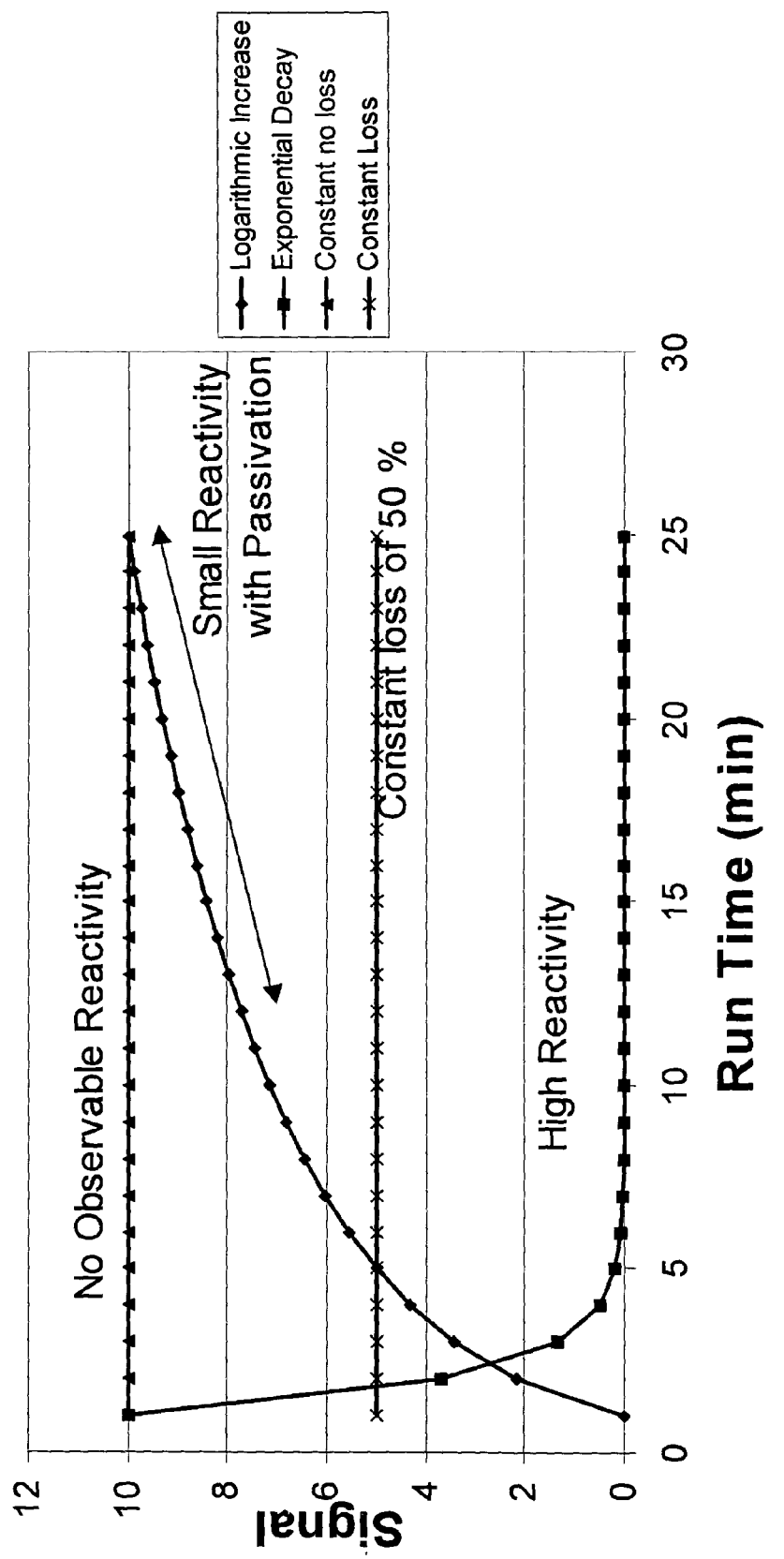
FIG. 2 is a chart depicting a theoretical representation of chromatographic voltage signals vs. time for regulators showing varying levels of reactivity.

There are various characteristics to study when examining the measured signals generated by the gas chromatograph, which correlate with hydrogen sulfide concentration, from the various comparison tests. Any decrease in signal levels would suggest some level of reactivity. A linear, exponential or power decrease in signal level would suggest high reactivity. An increase following a decrease in signal level would indicate some type of reactivity but with passivation, or loss of reactivity with time (i.e., adsorption or reaction until active sites are consumed or filled). An immediate steady state signal response would indicate either no reactivity or a constant reactivity. The two steady state possibilities can be distinguished by comparing a measured signal with a reference signal (i.e., a signal obtained when utilizing a restricting flow orifice) that is assumed to have no reactivity. A theoretical plot, in voltage signal vs. time, of each of these various behaviors is illustrated in the chart of FIG. 2.

Figure 3:
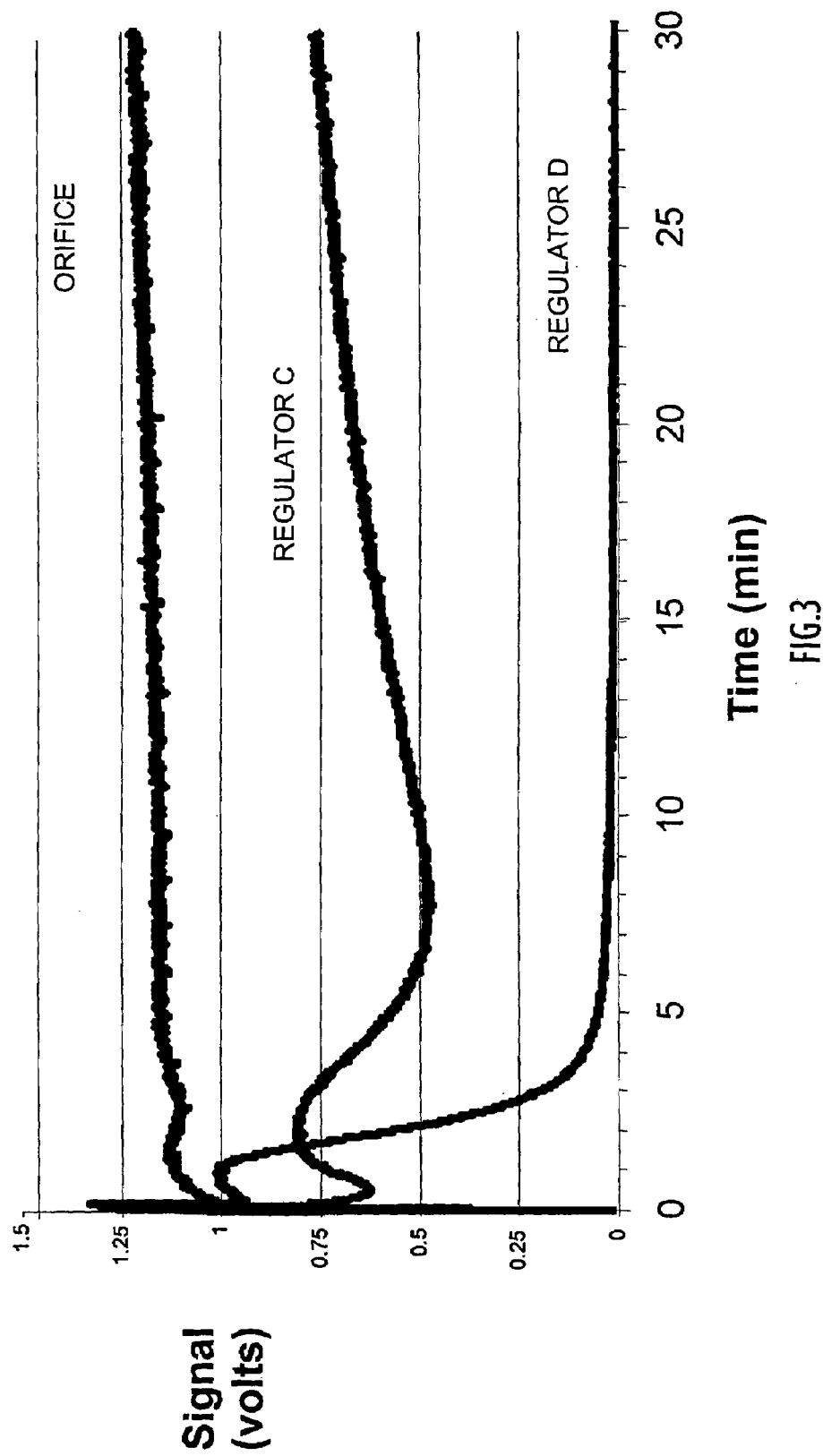
FIG. 3 is a chart depicting a chromatographic voltage signal vs. time generated by a 198 ppb hydrogen sulfide in balance nitrogen gas mixture flowing through a conventional two-stage regulator, a low dead volume nickel plated brass regulator, and a restricting flow orifice which provided a reference signal.

Initially, regulators C and D were compared with the orifice utilizing a 198 ppb hydrogen sulfide in balance nitrogen gas supply at a flow rate of 20 milliliters per minute (mL/min) to determine the performance of each with low concentration reactive gases. Regulator C had some prior service history with hydrogen sulfide and regulator D had been previously used with inert gases. The results of the tests are illustrated in the chart of FIG. 3. Referring to the chart, a signal (in volts) as measured by the gas chromatograph is plotted vs. time for each of the regulators and compared with a reference signal (obtained by flowing the gas through the restricting flow orifice). As is evident from the signal plots, the addition of a regulator clearly affects the signal results. For regulator C, passivation within the regulator is initially observed by the initial decrease in signal. However, after passivation is complete, the signal begins to increase toward the reference signal. For regulator D, the signal quickly diminishes to zero due to the gas reacting and/or adsorbing with the internal nickel plated brass surfaces of the regulator. The initial rise in signal observed for regulators C and D is believed to be due to the fast residence time of the gas within each regulator when the cylinder is first opened. As the residence time of the gas within the regulator approaches a constant value, the amount of reactivity and adsorption occurring within the regulator is readily observed.

Effect of Flow Rate on Reactive Gas Concentration

A comparison of regulators A, B, C and D was made at varying flow rates to determine the effect of changing flow rate to change in concentration of reactive gas. In essence, these tests were conducted to determine the effect of changing residence times on the reactivity of the gas with the regulators. If the reactivity and/or adsorption of a gas within a regulator is minimal or substantially not occurring, then the delivered concentration of gas from the regulator should not be significantly affected by variations in flow rate. Regulators A and B were new without any prior service history. Regulator D had been previously used in inert gas service, and regulator C had some prior service history with hydrogen sulfide.

Figure 4:
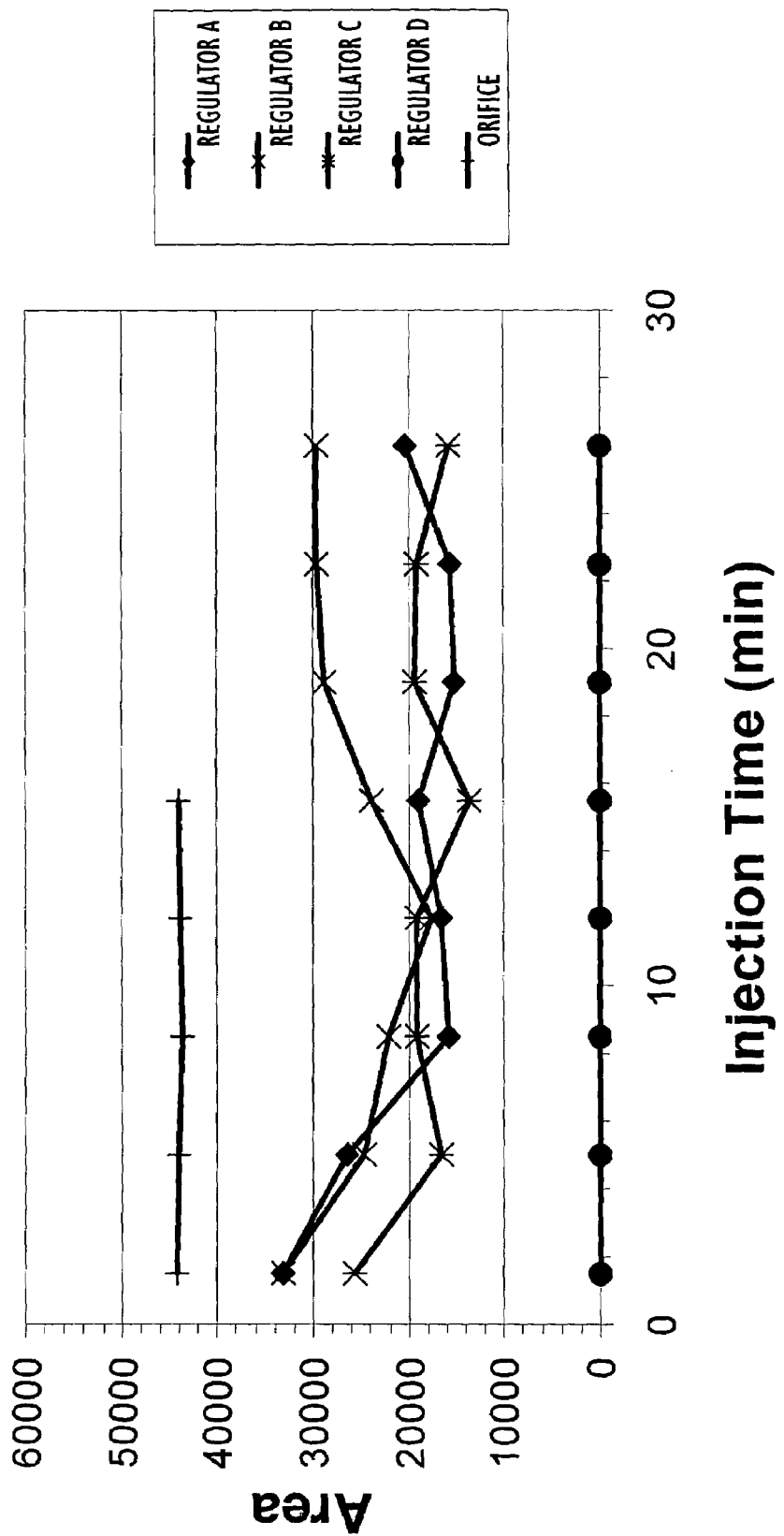
FIG. 4 is a chart depicting chromatographic area vs. injection time generated by a 198 ppb hydrogen sulfide in balance nitrogen gas mixture flowing at 5 mL/min through a number of different regulators including regulators of the present invention.
Figure 5:
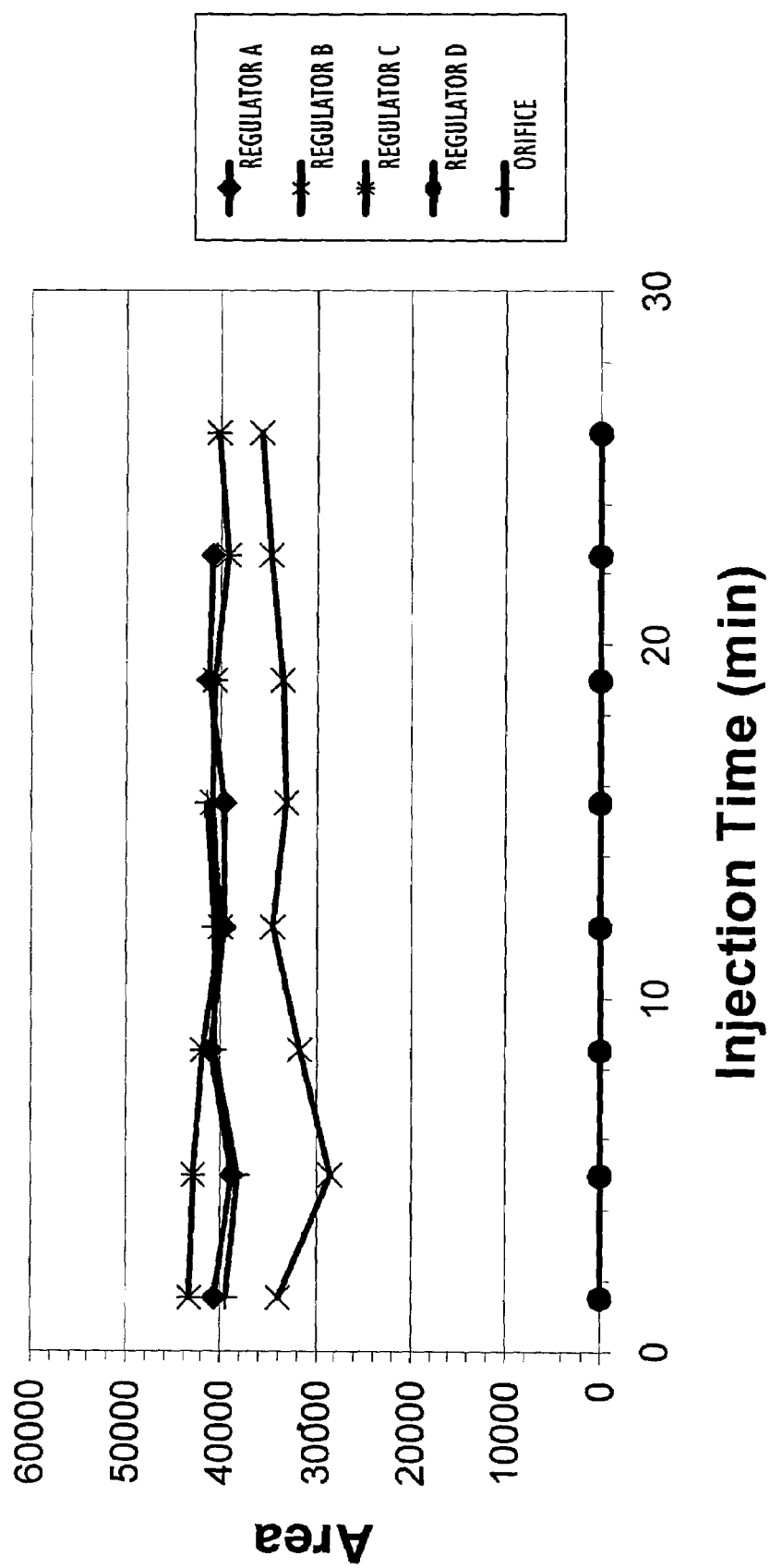
FIG. 5 is a chart depicting chromatographic area vs. injection time generated by a 198 ppb hydrogen sulfide in balance nitrogen gas mixture flowing at 50 mL/min through a number of different regulators including regulators of the present invention.

A cylinder containing 100 ppb hydrogen sulfide in balance nitrogen was connected to each regulator, and concentration measurements were recorded vs. time for four different flow rates of 5 mL/min, 10 mL/min, 50 mL/min and 100 mL/min. The results of these tests are depicted in the charts of FIGS. 4 and 5 (for 5 mL/min and 50 mL/min, respectively). In these charts, the signal (measured in peak areas by the gas chromatograph) is plotted for each regulator vs. time. A reference signal (measured using the restricting flow orifice) is also depicted.

The test results when utilizing a gas flow rate of 5 mL/min are depicted in FIG. 4. As can be seen from the data, the stainless steel regulator of the present invention (regulator A), the aluminum regulator of the present invention (regulator B) and the commercially available stainless steel regulator (regulator C) exhibited similar behavior patterns, where the signal plots showed an initial signal decay and then signal stabilization to varying levels. In contrast, the nickel plated brass regulator (regulator D) never showed an increase in signal, indicating an almost complete depletion of hydrogen sulfide from the gas stream due to reactivity and/or adsorption within the regulator. All of the signal values were observed to be below the reference signal.

Increasing the flow rate of the hydrogen sulfide gas to 10 mL/min also increased the performance of regulators A, B and C. The signals were relatively steady although the steady state values were still lower than the reference signal. Regulator D still showed no signal. At a standard flow of 50 mL/min and 100 mL/min both stainless steel regulators A and C behaved similarly. The signals observed by these two regulators were similar to that of the orifice and invariant with time. The aluminum regulator B had a slightly lower signal level at 50 mL/min and a comparable signal level at 100 mL/min. As before, the nickel plated brass regulator D showed no signal at all. The signal values for tests conducted at 50 mL/min are depicted in the chart of FIG. 5.

The results of these tests show that a new, non-passivated regulator manufactured in accordance with the present invention that is subjected to a low concentration reactive gas at varying flow rates performs in a similar manner as a conventional stainless steel regulator that has been subjected to several hours of passivation prior to being placed in service. In other words, the regulator of the present invention obviates the need for extended passivation periods before being placed in service with a low concentration reactive gas, particularly when flow rates of at least about 50 mL/min are utilized. As indicated in the results depicted in FIG. 5, the outlet concentration of regulator A deviated by less than 3% of the standard deviation and was maintained at a value greater than 75% of the inlet concentration within the first hour of service.

Effect of Passivation on Regulator Performance

A comparison was made between the conventional stainless steel regulator C and the stainless steel regulator A of the present invention to determine the effect of passivation on performance of each regulator. Each regulator was tested with a supply of 100 ppb hydrogen sulfide in balance nitrogen at a flow rate of 5 mL/min and 100 mL/min.

Figure 6:
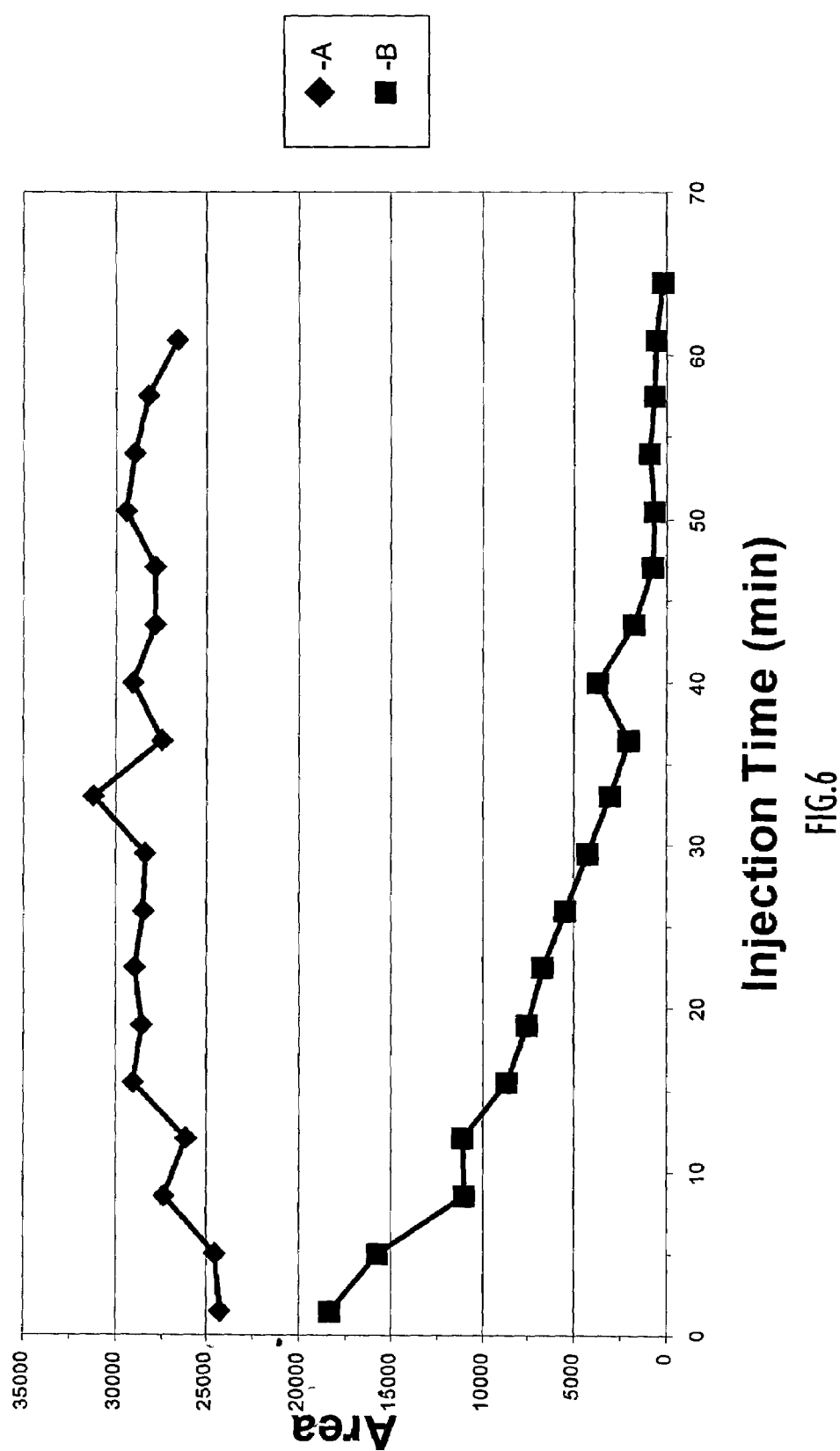
FIG. 6 is a chart depicting chromatographic area vs. injection time generated by a 100 ppb hydrogen sulfide in balance nitrogen gas mixture flowing at 5 mL/min through a conventional, fully passivated regulator and a conventional, new and non-passivated regulator.
Figure 7:
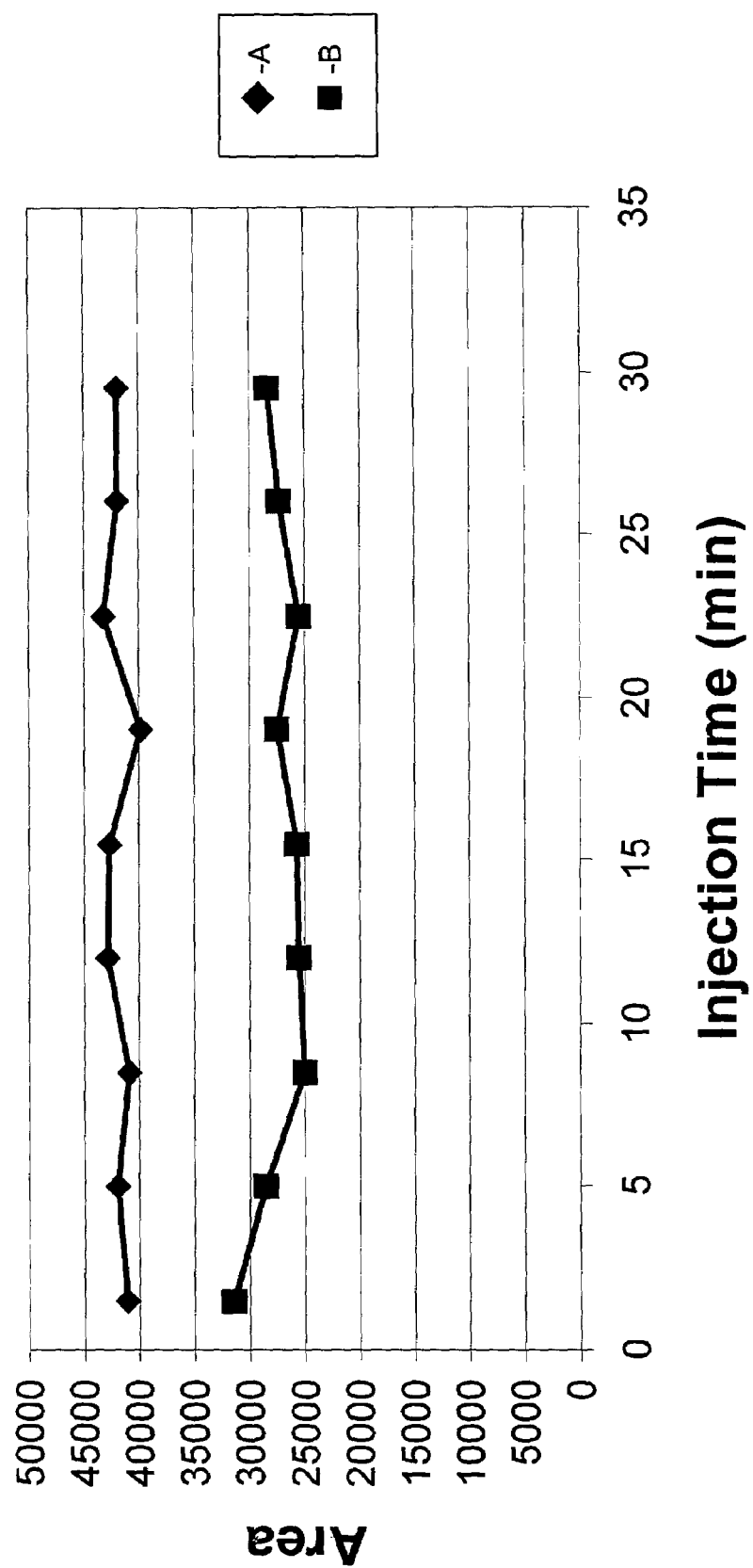
FIG. 7 is a chart depicting chromatographic area vs. injection time generated by a 100 ppb hydrogen sulfide in balance nitrogen gas mixture flowing at 100 mL/min through a conventional, fully passivated regulator and a conventional, new regulator that has been partially passivated with 5000 ppm hydrogen sulfide over a 12 hour period.

For the first series of tests, a well passivated regulator C that was used in service for more than two years was compared with a new regulator C that was not subjected to any passivation prior to use. A comparison of the behavior of both of these regulators was made, and the results are depicted in the charts of FIGS. 6 and 7. In particular, FIG. 6 depicts the signals (in measured chromatographic area) of the new and passivated regulators C vs. injection time at a flow rate of 5 mL/min., where the signal plot referenced as "A" refers to the passivated regulator C and the signal plot referenced as "B" refers to the new regulator C. As indicated in the chart of FIG. 6, the regulator C which was previously passivated shows a fairly constant response, whereas the signal corresponding to the new regulator C decays rather quickly to a zero value.

In the next test, the new regulator C was passivated for about 15 hours with 5000 ppm hydrogen sulfide in balance nitrogen. The two regulators were subsequently subjected to the hydrogen sulfide gas at 100 mL/min, and the results are plotted in the chart of FIG. 7, where the signal plot referenced as "A" refers to the original, fully passivated regulator C and the signal plot referenced as "B" refers to the partially passivated regulator C. As can be seen from the chart, the signal intensity of the fully passivated regulator C is still significantly higher than the signal obtained from the partially passivated regulator C at 100 mL/min. This indicates that surface adsorption and/or reaction is still occurring on the surface of the partially passivated regulator C.

Figure 8:
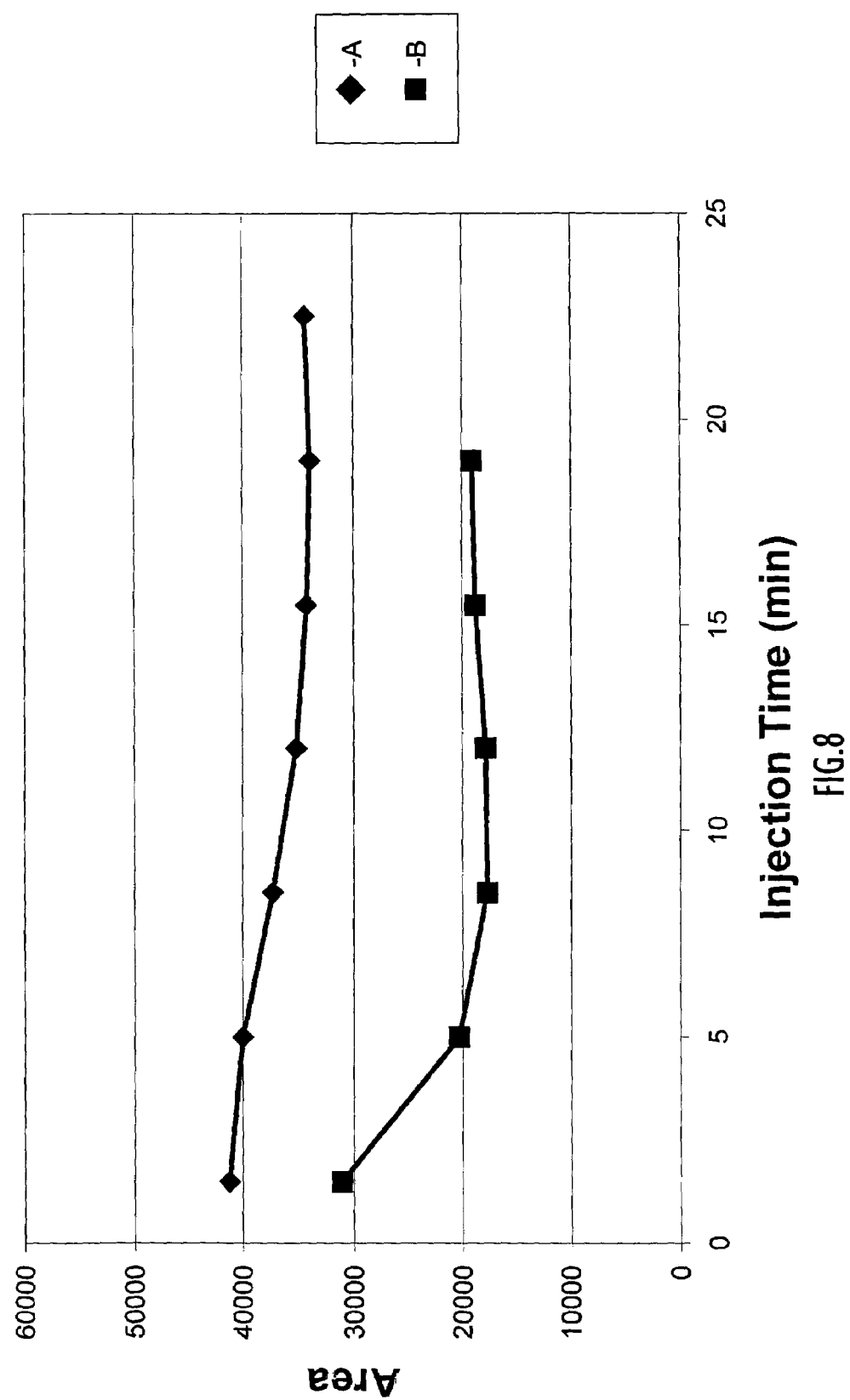
FIG. 8 is a chart depicting chromatographic area vs. injection time generated by a 100 ppb hydrogen sulfide in balance nitrogen gas mixture flowing at 5 mL/min through a regulator of the present invention that has been subjected to passivation and a regulator of the present invention that has not been passivated.
Figure 9:
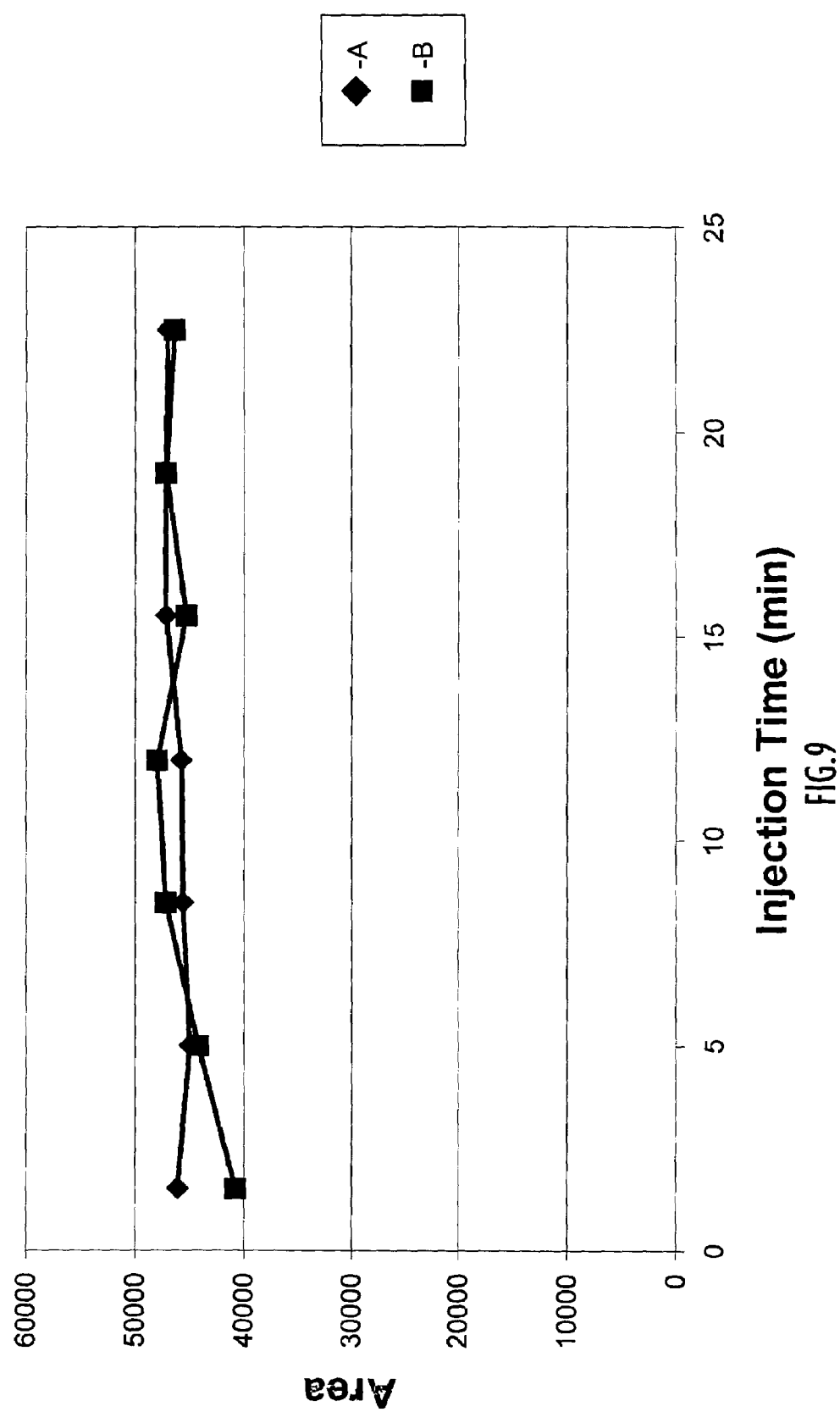
FIG. 9 is a chart depicting chromatographic area vs. injection time generated by a 100 ppb hydrogen sulfide in balance nitrogen gas mixture flowing at 100 mL/min through a regulator of the present invention that has been subjected to passivation and a regulator of the present invention that has not been passivated.

A similar series of tests was conducted with regulator A, where one regulator A was initially passivated for a period of more than six months and another regulator A was not subjected to any passivation prior to the initial test. In the two series of tests at different flow rates, a new regulator A was provided for the tests rather than a partially passivated regulator. The results of the tests are depicted in the charts of FIGS. 8 and 9, where the signal plot referenced as "A" refers to the initially passivated regulator A and the signal plot referenced as "B" refers to the new, unpassivated regulator A. In addition, FIG. 8 depicts the results observed at a flow rate of 5 mL/min, whereas FIG. 9 depicts the results observed at a flow rate of 100 mL/minute.

The test results depicted in FIGS. 6–9 indicate that the difference between the new and passivated regulators A (FIG. 8) was not as significant at a flow rate of 5 mL/min in comparison to the new and passivated regulators C (FIG. 6). The results further indicate that, at a flow rate of 100 mL/min, there was no significant difference in signal between the passivated and new regulators A (FIG. 9).

However, a difference was still observed between the passivated and partially passivated regulators C at the same flow rate (FIG. 7).

The difference in results between regulator A (i.e., the regulator of the present invention) and regulator C is believed to be associated with the reduced internal surface area of regulator A which in turn reduces potential wettable areas and minimizes residence time within the regulator. The results further indicate that, while passivation can enhance the performance of regulator A for low concentration reactive gases at low flow rates (e.g., at or below 5 mL/min), the time required to sufficiently passivate regulator A is significantly less than regulator C.

Thus, the test results indicate that it is possible to employ a regulator in accordance with the present invention with minimal or no passivation required for processing reactive gases at low concentrations (e.g., about 10 ppm or less). Depending upon the flow rate selected for the gas (e.g., at or above about 50 mL/min), the regulator can be put into service without the requirement of passivation while maintaining a desired output concentration (e.g., within about 5% or less of the relative standard deviation, and at least about 10% of the inlet concentration) of the reactive gas from the regulator throughout the entire use of the regulator. Alternatively, the regulator may be passivated for a minimal time period that is less than the required passivation time for conventional, high volume regulators.

Having described novel regulators for use with low concentration corrosive and reactive gases, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A filter-less regulator for use in a fluid flow system that processes low concentration reactive gases, the regulator comprising:
   a housing including an inlet, an outlet and a fluid flow path defined between the inlet and outlet by internal surfaces of the housing; and
   a pressure regulating section to reduce the pressure of a reactive gas flowing through the regulator between the housing inlet and the housing outlet the pressure regulating section including a plurality of pressure reducing stages to reduce the pressure of the reactive gas from an inlet pressure to an outlet pressure that is lower than the inlet pressure;
   wherein the internal surfaces of the housing are formed of stainless steel and the combined area of the internal surfaces is sufficiently sized to facilitate processing of a reactive gas having an inlet concentration no greater than about 10 ppm and flowing at a suitable flow rate into the housing inlet such that when the regulator is implemented for use in the fluid flow system without prior passivation, an outlet concentration of the reactive gas does not decrease to a value that is less than about 10% of the inlet concentration during an initial one hour period of use of the regulator.

2. The regulator of claim 1, wherein the combined area of the internal surfaces is sufficiently sized to facilitate processing of a reactive gas having an inlet concentration no greater than about 10 ppm and flowing at a suitable flow rate into the housing inlet such that, when the regulator is implemented for use in the fluid flow system without prior passivation, the outlet concentration of the reactive gas does not deviate by more than about 5% of the relative standard deviation.

3. The regulator of claim 1, wherein the plurality of pressure reducing stages comprises a high pressure chamber to receive the reactive gas at the inlet pressure, an intermediate pressure chamber to receive the reactive gas from the high pressure chamber and reduce the pressure of the reactive gas from the inlet pressure to an intermediate pressure, and a low pressure chamber to receive the reactive gas from the intermediate pressure chamber and reduce the reactive gas from the intermediate pressure to the outlet pressure.

4. The regulator of claim 3, wherein the intermediate pressure chamber includes a movable piston that releasably seals an opening at the interface between the high and intermediate pressure chambers during operation of the regulator to control the flow of the reactive gas into the intermediate chamber.

5. The regulator of claim 3, wherein the low pressure chamber includes a flexible diaphragm that releasably seals an opening between portions of the low pressure chamber during operation of the regulator to control the flow of the reactive gas through the low pressure chamber to the housing outlet.

6. The regulator of claim 5, further comprising:
   a pressure control member coupled with the diaphragm, the pressure control member being selectively manipulated to control an amount of force applied to the diaphragm so as to control the flow of the reactive gas through the low pressure chamber as well as the pressure level of the reactive gas at the housing outlet.

7. A filter-less regulator for use in a fluid flow system that processes low concentration reactive gases, the regulator comprising:
   a housing including an inlet, an outlet and a flow path defined between the inlet and the outlet by internal surfaces of the housing, wherein the combined area of the internal surfaces is no greater than about 97 square centimeters, wherein the internal surfaces of the housing are formed of stainless steel; and
   a pressure regulating section to reduce the pressure of a reactive gas flowing through the regulator between the housing inlet and the housing outlet, the pressure regulating section having a plurality of pressure reducing stages to reduce the pressure of the reactive gas from an inlet pressure to an outlet pressure that is lower than the inlet pressure.

8. The regulator of claim 7, wherein the combined area of the internal surfaces is no greater than about 52 square centimeters.

9. A fluid flow system including the regulator of claim 7, the system further being devoid of a filter at any location upstream from the regulator.

10. A method of processing a low concentration reactive gas in a fluid supply system, the method comprising:
   (a) providing a filter-less regulator including a housing with an inlet, an outlet and a flow path defined between the inlet and the outlet by internal surfaces of the housing, and a pressure regulating section, wherein the combined area of the internal surfaces is no greater than about 97 square centimeters;
   (b) installing the regulator in-line with a reactive gas supply source in the fluid supply system, the reactive gas supply source comprising a gas cylinder containing the reactive gas; and
   (c) flowing the reactive gas through the regulator at a selected flow rate to reduce the pressure of the reactive gas from an inlet pressure to an outlet pressure that is lower than the inlet pressure, wherein the reactive gas is supplied to the housing inlet of the regulator at an inlet concentration of no greater than about 10 ppm.

11. The method of claim 10, wherein the reactive gas is selected from the group consisting of hydrogen sulfide, sulfur dioxide, carbonyl sulfide, mercaptans, hydrogen chloride, chlorine, boron trichloride, ammonia, amines, amides, nitric oxide, nitrous oxide, nitrogen dioxide, carbon monoxide, carbon dioxide, arsine, volatile organic carbons (VOC's), oxygenates, and combinations thereof.

12. The method of claim 10, wherein the combined area of the internal surfaces is no greater than about 52 square centimeters.

13. The method of claim 10, wherein the regulator is provided in-line with the reactive gas supply source without any prior passivation with the reactive gas.

14. The method of claim 13, wherein the concentration of reactive gas supplied to the housing inlet of the regulator and the selected flow rate are such that an outlet concentration of the reactive gas from the regulator does not decrease to a value of less than about 10% of the inlet concentration during an initial one hour period in which the reactive gas flows through the regulator.

15. The method of claim 13, wherein the concentration of reactive gas is supplied to the housing inlet of the regulator and the selected flow rate are such that an outlet concentration of the reactive gas from the regulator does not deviate by more than about 5% of the relative standard deviation.

16. The method of claim 10, wherein a substantial portion of the internal surfaces of the housing are comprised of stainless steel.

17. The method of claim 10, wherein the pressure regulating section includes a plurality of pressure reducing stages to reduce the pressure of the reactive gas from an inlet pressure to an outlet pressure that is lower than the inlet pressure.

18. The method of claim 10, wherein the pressure regulating section further includes a high pressure chamber to receive the reactive gas at the inlet pressure, an intermediate pressure chamber to receive the reactive gas from the high pressure chamber and reduce the pressure of the reactive gas from the inlet pressure to an intermediate pressure, and a low pressure chamber to receive the reactive gas from the intermediate pressure chamber and reduce the reactive gas from the intermediate pressure to the outlet pressure.

19. The method of claim 18, wherein the intermediate pressure chamber includes a movable piston that releasably seals an opening at the interface between the high and intermediate pressure chambers during operation of the regulator to control the flow of the reactive gas into the intermediate chamber.

20. The method of claim 18, wherein the low pressure chamber includes a flexible diaphragm that releasably seals an opening between portions of the low pressure chamber during operation of the regulator to control the flow of the reactive gas through the low pressure chamber to the housing outlet.

21. The method of claim 10, wherein the fluid supply system is devoid of a filter at any location upstream from the regulator.

22. A method of processing a low concentration reactive gas in a fluid supply system, the method comprising:
(a) providing a filter-less regulator including a housing with an inlet, an outlet and a flow path defined between the inlet and the outlet by internal surfaces of the housing, and a pressure regulating section, wherein the combined area of the internal surfaces is no greater than about 97 square centimeters;
(b) installing the regulator in-line with a reactive gas supply source in the fluid supply system, wherein the regulator has not been subjected to any prior passivation with the reactive gas prior to installation in-line with the reactive gas supply source; and
(c) flowing the reactive gas at an inlet concentration of no greater than about 10 ppm through the regulator at a selected flow rate to reduce the pressure of the reactive gas from an inlet pressure to an outlet pressure that is lower than the inlet pressure;
wherein the reactive gas emerges from the regulator at an outlet concentration that does not decrease to a value of less than about 10% of the inlet concentration during an initial one hour period in which the reactive gas flows through the regulator.

23. The method of claim 22, wherein the outlet concentration of the reactive gas does not deviate by more than about 5% of the relative standard deviation during the initial one hour period in which the reactive gas flows through the regulator.

24. A filter-less regulator for use in a fluid flow system that processes low concentration reactive gases, the regulator comprising:
a housing including an inlet, an outlet and a fluid flow path defined between the inlet and outlet by internal surfaces of the housing, wherein the internal surfaces of the housing are formed of aluminum; and
a pressure regulating section to reduce the pressure of a reactive gas flowing through the regulator between the housing inlet and the housing outlet, the pressure regulating section including a plurality of pressure reducing stages to reduce the pressure of the reactive gas from an inlet pressure to an outlet pressure that is lower than the inlet pressure;
wherein the internal surfaces of the housing are formed of aluminum and the combined area of the internal surfaces is sufficiently sized to facilitate processing of a reactive gas having an inlet concentration no greater than about 10 ppm and flowing at a suitable flow rate into the housing inlet such that, when the regulator is implemented for use in the fluid flow system without prior passivation, an outlet concentration of the reactive gas does not decrease to a value that is less than about 10% of the inlet concentration during an initial one hour period of use of the regulator.

25. A method of processing a low concentration reactive gas in a fluid supply system, the method comprising:
(a) providing a filter-less regulator including a housing with an inlet, an outlet and a flow path defined between the inlet and the outlet by internal surfaces of the housing, and a pressure regulating section;
(b) installing, the regulator in-line with a reactive gas supply source in the fluid supply system, wherein the regulator has not been subjected to any prior passivation with the reactive gas prior to installation in-line with the reactive gas supply source and the reactive gas supply source comprises a gas cylinder containing the reactive gas; and
(c) flowing the reactive gas at an inlet concentration of no greater than about 10 ppm through the regulator at a selected flow rate to reduce the pressure of the reactive gas from an inlet pressure to an outlet pressure that is lower than the inlet pressure;
wherein the reactive gas emerges from the regulator at an outlet concentration that does not decrease to a value of less than about 10% of the inlet concentration during an initial one hour period in which the reactive gas flows through the regulator.

* * * * *